United States Patent
Jeong et al.

(10) Patent No.: US 12,381,222 B2
(45) Date of Patent: *Aug. 5, 2025

(54) NEGATIVE ELECTRODE FOR SECONDARY BATTERY, AND SECONDARY BATTERY INCLUDING SAME

(71) Applicant: SK On Co., Ltd., Seoul (KR)

(72) Inventors: Kwang Ho Jeong, Daejeon (KR); Hyun Joong Jang, Daejeon (KR); Da Bin Chung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,258

(22) Filed: Jun. 4, 2024

(65) Prior Publication Data

US 2024/0322171 A1    Sep. 26, 2024

Related U.S. Application Data

(63) Continuation of application No. 17/511,744, filed on Oct. 27, 2021, now Pat. No. 12,034,164.

(30) Foreign Application Priority Data

Oct. 29, 2020 (KR) .................. 10-2020-0142111

(51) Int. Cl.
| | | |
|---|---|---|
| *H01M 4/583* | (2010.01) | |
| *H01M 4/02* | (2006.01) | |
| *H01M 4/48* | (2010.01) | |
| *H01M 4/62* | (2006.01) | |

(52) U.S. Cl.
CPC ............ *H01M 4/583* (2013.01); *H01M 4/48* (2013.01); *H01M 4/622* (2013.01); *H01M 2004/021* (2013.01); *H01M 2004/027* (2013.01)

(58) Field of Classification Search
CPC ........ H01M 4/583; H01M 4/48; H01M 4/622; H01M 2004/021; H01M 2004/027; H01M 4/131; H01M 4/133; H01M 4/364; H01M 4/483; H01M 10/0525; H01M 4/587; H01M 4/366; H01M 10/052

See application file for complete search history.

(56) References Cited

U.S. PATENT DOCUMENTS

| | | | |
|---|---|---|---|
| 12,034,164 B2 * | 7/2024 | Jeong .................... | H01M 4/364 |
| 2013/0174370 A1 | 7/2013 | Saruwatari et al. | |
| 2019/0027740 A1 * | 1/2019 | Lee ......................... | H01M 4/62 |
| 2020/0185719 A1 * | 6/2020 | Piao ...................... | H01G 11/42 |
| 2020/0243848 A1 * | 7/2020 | Kim ...................... | H01M 4/587 |
| 2020/0365881 A1 * | 11/2020 | Tanaka ................. | H01M 4/622 |

FOREIGN PATENT DOCUMENTS

| | | |
|---|---|---|
| JP | 2017062911 A | 3/2017 |
| JP | 6644692 B2 | 2/2020 |
| KR | 1020170039976 A | 4/2017 |
| KR | 1020180040268 A | 4/2018 |
| KR | 1020190019854 A | 2/2019 |
| KR | 1020190047195 A | 5/2019 |
| KR | 1020190049585 A | 5/2019 |
| WO | 2014128946 A1 | 8/2014 |
| WO | 2020071814 A1 | 4/2020 |

OTHER PUBLICATIONS

"A Basic Guide to Particle Characterization", Malvern Instruments Worldwide, 2012, pp. 1-26.

* cited by examiner

*Primary Examiner* — Stewart A Fraser
(74) *Attorney, Agent, or Firm* — The Webb Law Firm

(57) ABSTRACT

A negative electrode for a secondary battery includes: a current collector; a first negative electrode active material layer formed on the current collector and containing a first active material; and a second negative electrode active material layer formed on the first negative electrode active material layer and containing a second active material. The second active material is a bimodal active material including small particles and large particles having different particle sizes, a particle size (D2) of the second active material is smaller than a particle size (D1) of the first active material, and the particle size of the second active material is an average particle size of the small particles and the large particles.

12 Claims, No Drawings

NEGATIVE ELECTRODE FOR SECONDARY BATTERY, AND SECONDARY BATTERY INCLUDING SAME

CROSS-REFERENCE TO RELATED APPLICATION

This application is a continuation of U.S. patent application Ser. No. 17/511,744, filed Oct. 27, 2021, which claims priority to Korean Patent Application No. 10-2020-0142111 filed Oct. 29, 2020, the disclosures of which are hereby incorporated by reference in their entirety.

BACKGROUND OF THE INVENTION

Field of the Invention

The following disclosure relates to a negative electrode for a secondary battery, and a secondary battery including the same.

Description of Related Art

Recently, in accordance with an increase in the demand for electronic devices such as mobile devices, development of technologies for weight reduction and miniaturization of electrochemical batteries (secondary batteries) for increasing portability of the electronic devices has been expanded. In addition to such a trend, in accordance with a global trend toward tightening regulations on fuel efficiency and exhaust gas of automobiles, the growth of an electric vehicle (EV) market has been accelerated, such that the development of high-output and large-capacity batteries to be used in such electric vehicles has been demanded.

Among these batteries, a lithium secondary battery having a high energy density and voltage, a long cycle lifespan, and a low discharge rate has been widely used. The lithium secondary battery is a secondary battery that includes a positive electrode including a positive electrode active material, a negative electrode including a negative electrode active material, a separator, and an electrolyte and is charged and discharged by intercalation-desorption of lithium ions.

A lithium metal has been mainly used as a negative electrode material for the lithium secondary battery in the early stage, but a separator damage caused by lithium atom growth on a surface of the metal lithium has occurred in accordance with the progress of charging and discharging. Therefore, recently, carbon-based materials have been mainly used as the negative electrode material for the lithium secondary battery. Among the carbon-based materials, graphite having a relatively low price and a long service lifespan has been used most. However, the graphite has a very small interlayer distance of 0.335 nm, has few sites for lithium ions to be intercalated, and has a long diffusion distance through a graphite basal plane is long, such that a capacity is 372 mAh/g, which is restrictive. In addition, due to a problem such as low packing density and poor particle orientation at the time of manufacturing an electrode using the graphite because the graphite has a plate-like structure, an intercalation rate of the lithium ions is slow, and thus, high output characteristics are not satisfied.

Therefore, there is a need to develop a negative electrode having excellent lifespan characteristics while exhibiting a large capacity and a high output.

SUMMARY OF THE INVENTION

An embodiment of the present invention is directed to providing a negative electrode having improved rapid charging characteristics without decreasing an electrode density of the negative electrode.

Another embodiment of the present invention is directed to providing a negative electrode having stable lifespan characteristics without generating a decrease in adhesion between a current collector and a negative electrode active material layer even under a rapid charging condition.

In one general aspect, a negative electrode for a secondary battery includes: a current collector; a first negative electrode active material layer formed on the current collector and containing a first active material; and a second negative electrode active material layer formed on the first negative electrode active material layer and containing a second active material, wherein the second active material is a bimodal active material including small particles and large particles having different particle sizes, a particle size (D2) of the second active material is smaller than a particle size (D1) of the first active material, and the particle size of the second active material is an average particle size of the small particles and the large particles.

The small particles may have a particle size (D50) of 30 to 90% of a particle size (D50) of the large particles.

The small particles may have a particle size (D50) of 30 to 80% of the particle size (D50) of the large particles.

The particle size (D2) of the second active material may be 20% to 95% of the particle size (D1) of the first active material.

The particle size (D2) of the second active material may be 30% to 70% of the particle size (D1) of the first active material.

The first and second active materials may include one or more selected from the group consisting of natural graphite, artificial graphite, graphitized carbon fiber, graphitized mesocarbon microbeads, and amorphous carbon.

The first and second active materials may be artificial graphite.

At least one of the first and second negative electrode active material layers may further include a silicon oxide-based active material ($SiO_x(0<x<2)$).

The silicon oxide-based active materials in the first and second negative electrode active material layers may satisfy the following Relational Equation 1:

$$W2 > 2*W1 \qquad \text{[Relational Equation 1]}$$

wherein W1 is a content of the silicon oxide-based active material in the first negative electrode active material layer, W2 is a content of the silicon oxide-based active material in the second negative electrode active material layer, and W1≥ 0.

The first and second negative electrode active material layers may further include a binder, and the binder may be a water-soluble binder.

The binder may include styrene-butadiene rubber.

The negative electrode may have a rolling density of 1.65 to 1.85 g/cc.

In another general aspect, a secondary battery includes: the negative electrode as described above; a positive electrode; a separator interposed between the negative electrode and the positive electrode; and an electrolyte.

DESCRIPTION OF THE INVENTION

Advantages and features of the present invention and methods accomplishing them will become apparent from the following detailed description of embodiments. However, the present invention is not limited to embodiments to be described below, but may be implemented in various different forms, these embodiments will be provided only in order to make the present invention complete and allow one of ordinary skill in the art to which the present invention pertains to completely recognize the scope of the present invention, and the present invention will be defined by the scope of the claims. "And/or" includes each and all of one or more combinations of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

In the present specification, when an element such as a layer, a film, a region, or a plate is referred to as being "on" another element, it may be directly on another element or may be on another element with the other element interposed therebetween.

In the present specification, a particle size may refer to D50, and D50 refers to a particle diameter when a cumulative volume becomes 50% from a small particle size in particle size distribution measurement by a laser scattering method. Here, D50 may be obtained by performing sampling according to a KS A ISO 13320-1 standard and measuring particle size distribution using Mastersizer3000 available from Malvern Instruments, Inc. Specifically, ethanol is used as a solvent, particles are dispersed using an ultrasonic disperser if necessary, and a volume density may then be measured.

The present invention provides a negative electrode for a secondary battery including: a current collector; a first negative electrode active material layer formed on the current collector and containing a first active material; and a second negative electrode active material layer formed on the first negative electrode active material layer and containing a second active material, wherein the second active material is a bimodal active material including small particles and large particles having different particle sizes, a particle size (D2) of the second active material is smaller than a particle size (D1) of the first active material, and the particle size of the second active material is an average particle size of the small particles and the large particles.

In general, as a method for improving rapid charging characteristics of a secondary battery, there is a method of making charging of the secondary battery possible at a high charging rate by decreasing a loading amount of a negative electrode active material or a rolling density of a negative electrode to increase a porosity of the negative electrode so that ions and/or electrons smoothly move. However, as described above, when the loading amount or the rolling density is decreased, it becomes difficult to increase a density of the negative electrode, such that it is difficult to obtain a battery having a large capacity, and an adhesion between a negative electrode active material layer and a current collector is decreased, such that lifespan characteristics of the battery may be deteriorated.

On the other hand, the negative electrode for a secondary battery according to the present invention has a multilayer structure including the second negative electrode active material layer containing the bimodal active material, and thus, has an effect of exhibiting an excellent capacity and a capacity retention rate under a charging condition of 2 C rate or more without decreasing the loading amount of the negative electrode active material or the rolling density of the negative electrode as described above. In addition, the negative electrode for a secondary battery according to the present invention has a structure in which an active material having a smaller particle size is included in the second negative electrode active material layer (upper layer) than in the first negative electrode active material layer (lower layer), such that an adhesion between the negative electrode active material layer and the current collector may be significantly improved to exhibit stable cycle characteristics.

The first and second active materials are not particularly limited as long as they are active materials generally used for the negative electrode for a secondary battery, but may include specifically one or more selected from the group consisting of natural graphite, artificial graphite, graphitized carbon fiber, graphitized mesocarbon microbeads, and amorphous carbon.

In the negative electrode for a secondary battery according to the present invention, the particle size (D2) of the second active material may be smaller than the particle size (D1) of the first active material. In this case, D1 may refer to the particle size (D50) of the first active material, and D2 may refer to the average particle size of the small particles and the large particles of the bimodal active material and may specifically refer to a value obtained by adjusting a particle size (D50) of the small particles, a particle size (D50) of the large particles, and a mixing weight ratio between the small particles and the large particles. As a specific example, in a case where the second active material is prepared by mixing A parts by weight of the small particles having a particle size of D2-1 and B parts by weight of the large particles having a particle size of D2-2 with each other, the particle size (D2) of the second active material may be $(A*D2-1+B*D2-2)/(A+B)$. Accordingly, the particle size D2 of the second active material may be adjusted by the particle size of the small particles, the particle size of the large particles, and the mixing ratio between the small particles and the large particles.

The particle size (D2) of the second active material may be 20 to 95%, preferably 30 to 70%, of the particle size (D1) of the first active material. In this case, the particle size (D1) of the first active material may be 10 to 26 μm, preferably 10 to 24 μm, and more preferably 12 to 24 μm. In the above range, it is possible to prevent a problem that binder particles are inserted into grooves existing on a rough surface of the first active material, such that a content of effective binders is decreased. Accordingly, there is an effect of improving an adhesion between the negative electrode active material layer (the first negative electrode active material layer) and the current collector to exhibit stable performance even during a charging and discharging process for a long time. In terms of maximizing the content of the effective binders and improving the rapid charging characteristics at a high current, the first and second active materials may be artificial graphite.

The particle size (D2) of the second active material may be 5 to 18 μm, preferably 6 to 17 μm, and more preferably 6 to 15 μm. In this case, the small particles of the bimodal active material constituting the second active material may have a particle size (D50) of 30 to 90% of the particle size (D50) of the large particles. In a case where the second active material satisfying the above conditions is included in the second negative electrode active material layer, the negative electrode capable of a high rolling density of 1.65 to 1.85 g/cc and a loading amount of the negative electrode active material of 10 mg/cm$^2$ or more may be obtained, and a capacity may be increased and rapid charging characteristics may be improved due to the negative electrode having a high density.

In addition, in terms of enabling rapid charging at 2 C rate or more even in a low state of charge (SOC) state of 50% or less, the small particles may have a particle size (D50) of 30 to 80% of the particle size (D50) of the large particles. In this case, the particle size (D50) of the large particles may be 10 to 24 μm, preferably 12 to 24 μm.

At least one of the first and second negative electrode active material layers may further include a silicon oxide-based active material (SiO$_x$(0<x<2)). The silicon oxide-based active materials in the first and second negative electrode active material layers may satisfy the following Relational Equation 1:

$$W2 > 2*W1 \qquad \text{[Relational Equation 1]}$$

Wherein W1 is a content of the silicon oxide-based active material in the first negative electrode active material layer, W2 is a content of the silicon oxide-based active material in the second negative electrode active material layer, and W1≥0.

That is, in a case where a content of the silicon oxide-based active material in an upper layer (second negative electrode active material layer) exceeds two times the content of the silicon oxide-based active material in a lower layer (first negative electrode active material layer), chargeable characteristics of lithium of the silicon oxide-based active material in a three-dimensional direction may be maximized, such that a large capacity effect may be obtained, and a cycle lifespan may be excellent particularly even under a rapid charging condition.

The first and second negative electrode active material layers may further include a binder, and the binder may be a water-soluble binder. Specifically, the binder may be styrene-butadiene rubber, acrylated styrene-butadiene rubber, polyvinyl alcohol, sodium polyacrylate, a copolymer of propylene and olefin having 2 to 8 carbon atoms, polyacrylamide, a copolymer of (meth)acrylic acid and (meth)acrylic acid alkyl ester, or a combination thereof.

In a case where the water-soluble binder is used, the water-soluble binder may bind the electrode active material to the current collector well without affecting a viscosity of a slurry, but since the slurry may easily gel due to the electrode active material and a conductive material, which are fine particles, a thickener for making the slurry stable by imparting a viscosity to the slurry may be further included. As an example, the thickener may be a mixture of one or more of cellulose-based compounds, specifically, carboxymethyl cellulose, hydroxypropylmethyl cellulose, methyl cellulose, or alkali metal salts thereof. As an alkali metal, Na, K, or Li may be used.

The binder according to an embodiment of the present invention may include styrene-butadiene rubber in terms of imparting a stable adhesion at a high current.

The first and second negative electrode active material layers may further include a conductive material. The conductive material is used to impart conductivity to the negative electrode, and is not particularly limited as long as it is a conventional electrically conductive material that does not cause a chemical change in the secondary battery. As an example, the conductive material may be natural graphite, artificial graphite, carbon black, acetylene black, ketjen black, carbon fiber, carbon nanotube, and combinations thereof, but is not limited thereto.

The current collector may be one selected from the group consisting of copper foil, nickel foil, stainless steel foil, titanium foil, nickel foam, copper foam, a polymer substrate coated with a conductive metal, and combinations thereof, but is not limited thereto.

The present invention also provides a secondary battery including: the negative electrode according to an embodiment of the present invention; a positive electrode; a separator interposed between the negative electrode and the positive electrode; and an electrolyte.

The secondary battery including the negative electrode according to an embodiment of the present invention may have improved rapid charging characteristics and improved long-term stability, which is preferable.

The positive electrode may include a current collector and a positive electrode active material layer disposed on the current collector. A material of the current collector may be copper, nickel, or the like, but is not limited thereto.

The positive electrode active material is not particularly limited as long as it is a positive electrode active material generally used. As an example, the positive electrode active material may be a composite oxide of a metal selected from cobalt, manganese, nickel, and combinations thereof and lithium, but is not limited thereto.

The separator is not particularly limited as long as it is a separator known in the art. For example, the separator may be selected among glass fiber, polyester, polyethylene, polypropylene, polytetrafluoroethylene, or combinations thereof, may be in the form of a non-woven fabric or a woven fabric, and may optionally be used in a single-layer or multi-layer structure.

The electrolyte includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethane (DME), Y-butyrolactone (BL), tetrahydrofuran (THF), 1,3-dioxolane (DOL), diethyl ester (DEE), methyl formate (MF), methyl propionate (MP), sulfolane(S), dimethyl sulfoxide (DMSO), acetonitrile (AN), or a mixture thereof, but is not limited thereto. The electrolytic salt is a material dissolved in the non-aqueous organic solvent, acting as a supply source of electrolytic metal ions in the secondary battery to enable a basic operation of the secondary battery, and promoting movement of the electrolytic metal ions between the positive electrode and the negative electrode. As a non-restrictive example, in a case where an electrolytic metal is lithium, the electrolytic salt may be LiPF$_6$, LiBF$_4$, LiTFSI, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x+1}$SO$_2$) (C$_y$F$_{2y+1}$SO$_2$) (here, x and y are natural numbers), LiCl, LiI, or a mixture thereof, but is not limited thereto. In addition, the electrolyte salt may be a known material used in a concentration suitable for the purpose, and may further, if necessary, include a known solvent or additive in order to improve charging/discharging characteristics, flame-retardant characteristics, and the like.

EXAMPLE

Example 1

Step 1: Preparation of First Negative Electrode Slurry

Water was added to 93.4 wt % of artificial graphite having a particle size (D50) of 18 μm, 3.0 wt % of a carbon black conductive agent, 2.4 wt % of a styrene-butadiene rubber (SBR) binder, and 1.2 wt % of carboxymethyl cellulose (CMC), and mixing was then performed at room temperature for 120 minutes to prepare a first negative electrode slurry (50 wt % of a solid content).

Step 2: Preparation of Second Negative Electrode Slurry

Water was added to 95.2 wt % of artificial graphite having an average particle size of 10.7 μm, obtained by mixing small particle artificial graphite (D 50:7.5 μm) and large particle artificial graphite (D50:18 μm) with each other in a weight ratio of 7:3, 3.0 wt % of a carbon black conductive agent, 0.6 wt % of an SBR binder, and 1.2 wt % of CMC, and mixing was then performed at room temperature for 120 minutes to prepare a second negative electrode slurry (50 wt % of a solid content).

Step 3: Manufacture of Negative Electrode

The first negative electrode slurry prepared in Step 1 and the second negative electrode slurry prepared in Step 2 were coated on copper foil (thickness of 6 μm) using a dual slot die coater that may simultaneously perform coating on upper and lower layers to form preliminary first and second negative electrode active material layers.

The preliminary first and second negative electrode active material layers formed on the copper foil were dried for 2 minutes in a drying furnace heated by hot air of 130° C. to manufacture a negative electrode which has a structure of current collector/first negative electrode active material layer/second negative electrode active material layer and of which a final thickness of both surfaces is 120 μm through a rolling process.

Step 4: Manufacture of Pouch Cell

A positive electrode that uses NCM811 as a positive electrode material was used as a counter electrode to the manufactured negative electrode, a PE separator was interposed between the negative electrode and the positive electrode, positive electrode/PE separator/negative electrode were repeatedly stacked, and an electrolyte was then injected into a laminate to manufacture a pouch cell having an energy density of 590 Wh/L. In this case, as the electrolyte, an electrolyte obtained by adding 1.5 wt % of vinylene carbonate (VC) and 0.5 wt % of 1,3-propensultone (PRS) to a mixture of a lithium salt (1.0 M of $LiPF_6$) and an organic solvent (EC:EMC=3:7 Vol %) was used. Thereafter, pre-charging was performed for 36 minutes at a current (2.5 A) corresponding to 0.25 C. After 1 hour, degassing was performed, aging was performed for 24 hours or more, and formation charging and discharging was then performed (charging condition: CC-CV 0.2 C 4.2V 0.05C CUT-OFF, and discharging condition: CC 0.2C 2.5V CUT-OFF). Thereafter, standard charging and discharging was performed (charging condition: CC-CV ⅓ C 4.2V 0.05C CUT-OFF, and discharging condition: CC 0.5C 2.5V CUT-OFF).

Step 5: Manufacture of Three-Electrode Cell

A lithium titanium oxide (LTO) reference electrode was inserted into a jelly roll in a state in which positive electrode/separator/negative electrode were stacked in the same manner as in Step 4, and a pouch was then sealed to manufacture a three-electrode cell. Next, in the same manner as in Step 4, a pre-charging process, a degassing process, and an aging process were performed. In this case, the LTO reference electrode was manufactured by removing an end of copper foil that is insulation-coated, and then coating an LTO slurry (97 wt % of LTO, 2 wt % of Super P, and 1 wt % of PVDF), and the same electrolyte as in Step 4 was used as an electrolyte.

Evaluation Example

Evaluation Example 1: Evaluation of Interfacial Adhesion Between Negative Electrode Active Material Layer and Current Collector

Comparative Examples 1 and 2

Negative electrodes were manufactured in the same manner in Example 1 except that in Step 1 of Example 1, particle sizes of electrode active materials were values shown in the following Table 1, and in Step 2 of Example 1, artificial graphite having a particle size (D50) of 18 μm was used.

Comparative Example 3

A negative electrode was manufactured in the same manner in Example 1 except that in Step 2 of Example 1, artificial graphite having a particle size (D50) of 10.7 μm was used.

Each of the negative electrodes manufactured in Example 1 and Comparative Examples 1 to 3 was cut at a width of 18 mm and a length of 150 mm, and a tape having a width of 18 mm was attached to a foil layer of the negative electrode and then allowed to be sufficiently adhered to the foil layer with a roller having a load of 2 kg. The negative electrode active material layer was attached to one side of a tensile tester using a double-sided tape. The tape attached to the foil layer was fastened to the other side of the tensile tester, measurement of an adhesion was performed, and measurement results were shown in Table 1. Here, the negative electrode active material layer refers to first and second negative electrode active material layers.

Evaluation Example 1-2: Evaluation of Cohesion Between Negative Electrode Active Material Layers With respect to the negative electrodes prepared in Example 1 and Comparative Examples 1 to 3, an adhesion between the negative electrode active materials in an upper layer of the negative electrode was measured using a surface and interfacial cutting analysis system (SAICAS). Specifically, a diamond cutter blade of 1.0 mm was inserted to a depth corresponding to 20% of a total thickness of the negative electrode active material layer under a condition of a horizontal speed of 10 μm/sec and a vertical speed of 1 μm/sec, a force required to scrape the negative electrode active material layer was then measured, and measurement results were shown in the following Table 1.

TABLE 1

| | Artificial graphite of upper layer | | Particle size (D1) (μm) of artificial graphite of lower layer | Adhesion (N/mm) | Cohesion (N/mm) |
|---|---|---|---|---|---|
| | Particle size (D50) ratio between small particle and large particle | Particle size (D2) (μm) | | | |
| Example 1 | 0.42 | 10.7 | 18.0 | 0.05 | 0.15 |
| Comparative Example 1 | — | 18.0 | 18.0 | 0.05 | 0.15 |
| Comparative Example 2 | — | 18.0 | 10.7 | 0.03 | 0.15 |
| Comparative Example 3 | — | 10.7 | 18.0 | 0.05 | 0.1 |

In Table 1, D2 refers to an average particle size of the small particles and the large particles in the artificial graphite of the upper layer, and D1 refers to D50 of the artificial graphite of the lower side.

As can be seen in Table 1, it may be confirmed that an adhesion is higher in a case where the particle size (D1) of the artificial graphite of the lower layer is relatively large (Example 1, Comparative Example 1, Comparative Example 3) than in a case where the particle size (D1) of the artificial graphite of the lower layer is small (Comparative Example 2). In addition, it can be seen that such a tendency is also maintained in terms of cohesion, which means an adhesion between the active materials of the upper layer, but in a case where a bimodal form is applied to the upper layer (Example 1), the artificial graphite of the upper layer has a high cohesion despite having a particle size smaller than that of Comparative Examples 1 and 2. That is, it may be confirmed that in a case where the particle size (D1) of the artificial graphite of the lower layer is larger than the particle size (D2) of the artificial graphite of the upper layer and the bimodal form is applied to the upper layer (Example 1), both the adhesion and the cohesion are excellent.

Such a result implies that the adhesion decreases in accordance with a decrease in content of effective binders that impart a binding ability decreases. Specifically, it is analyzed that in a case where the artificial graphite having the small particle size is included in the lower layer, a phenomenon in which binder particles having a small size are inserted into grooves existing on a rough surface of the artificial graphite (active material) occurs, and accordingly, the content of the effective binders decreases. Therefore, in order to impart a high adhesion to the current collector, it is decided that it is important to adjust the particle size of the artificial graphite of the lower layer in direct contact with the current collector to be large and apply the bimodal form to the upper layer to increase the content of the effective binders.

Evaluation Example 2: Evaluation of Lifespan Characteristics According to Particle Sizes of First and Second Active Materials Examples 2 to 3

A negative electrode was manufactured in the same manner in Example 1 except that in Step 2 of Example 1, particle sizes of each electrode active material were values shown in the following Table 2. In this case, in Step 2, a particle size of large particles was maintained, but a particle size ratio between small particles and large particles was adjusted, and a mixing weight ratio between the small particles and the large particles was the same as that of Example 1.

Example 4

A negative electrode was manufactured in the same manner in Example 1 except that in Step 2 of Example 1, particle sizes of each electrode active material were values shown in the following Table 2. In this case, in Step 2, a particle size ratio between small particles and large particles was adjusted to 0.72 by changing particle sizes of large particles and small particles, and a mixing weight ratio between the small particles and the large particles was the same as that of Example 1.

(Evaluation Method)

Evaluation of Rapid Charging Cycle Lifespan Characteristic

Potentials of the negative electrodes were confirmed at the time of charging using three-electrode cells prepared in Examples 1 to 4 and Comparative Examples 1 and 2.

Specifically, step-charging protocols of Comparative Examples and Examples were configured by finding SOC points at which CCV values of the negative electrodes become constant at 0 V or less for each C-rate while CC-charging the three-electrode cells to 4.2 V at a C-rate in the range of 1.25 to 3.0 C and designating such SOC points as charging limits.

Charging times of Comparative Examples and Examples were calculated using the step charging protocols manufactured using the three-electrode cells, each step charging protocol was applied to the pouch cells manufactured in Step 4, rapid charging and ⅓C discharging of each cell were repeated for 300 cycles to calculate capacity retention rates (%), and calculation results were shown in the following Table 2.

TABLE 2

| | Artificial graphite (second active material) of upper layer | | | | Particle size (D1) (μm) of artificial graphite (first active material) of lower layer | Energy density (Wh/L) | Rapid charging time (min) | Capacity retention rate (%) |
|---|---|---|---|---|---|---|---|---|
| | Particle size (D2-1) μm of 2-1-th active material | Particle size (D2-2) μm of 2-2-th active material | D2-1/ D2-2 | Average particle size (D2) (μm) | | | | |
| Example 1 | 7.5 | 18 | 0.42 | 10.7 | 18 | 590 | 18.8 | 98.2 |
| Example 2 | 5.4 | 18 | 0.30 | 9.2 | 18 | 590 | 18.5 | 91.2 |
| Example 3 | 16.0 | 18 | 0.89 | 16.6 | 18 | 590 | 20.5 | 88.9 |
| Example 4 | 5.4 | 7.5 | 0.72 | 6.0 | 18 | 590 | 18.9 | 95.6 |
| Comparative Example 1 | — | 18 | — | 18 | 18 | 590 | 21.1 | 85.1 |
| Comparative Example 2 | — | 18 | — | 18 | 10.7 | 590 | 22.0 | 83.7 |

As can be seen in Table 2, in a case where the particle size (D2) of the second active material of the upper layer is smaller than the particle size (D1) of the first active material of the lower layer (Examples 1 to 4), all of the rapid charging times were 21 minutes or less, and all of the capacity retention rates at 300 cycles were also 88% or more, which indicates excellent lifespan characteristics. In this case, the particle size (D2) of the second active material refers to an average particle size of the small particles and the large particles.

On the other hand, in a case where D2 is the same as D1 or larger than D1 (Comparative Examples 1 and 2), initial energy densities were the same as that of Example, but rapid charging times were relatively long, and capacity retention rates were 86% or less, which is low. According to such a result, it is decided that the artificial graphite having a larger particle size is included in the upper layer than in the lower layer, and thus, a contact area between the electrolyte and the electrode active material in the upper layer is decreased, such that charging performance at a high current and a capacity according to a cycle are decreased.

Meanwhile, it can be seen from Examples 1 to 4 that the particle size D2 of the second active material of the upper layer is preferably 6 to 17 μm.

In addition, it can be seen that a particle size ratio (D2-1/D2-2) of the 2-1-th active material to the 2-2-th active material in the second active material of the upper layer is preferably 0.3 to 0.9, and more preferably 0.3 to 0.8, when the rapid charging times and the capacity retention rates of Examples 1 to 4 are comprehensively considered. Specifically, in a case where D2-1/D2-2 is excessively high, an effect of the present invention is significantly decreased, and a problem such as a decrease in lifespan characteristics due to an increase in resistance occurs. On the other hand, when D2-2/D2-1 is excessively low, it is determined that the cycle lifespan characteristics are decreased because a side reaction such as generation of a gas occurs due to an increase in contact area between the active material of the upper layer and the electrolyte.

Evaluation Example 3: Evaluation of Lifespan Characteristics According to Type of Electrode Active Material Examples 5 to 7

Negative electrodes were manufactured in the same manner in Example 1 except that in Steps 1 and 2 of Example 1, electrode active materials were materials shown in the following Table 3.

(Evaluation Method)
Evaluation of Cycle Lifespan Characteristics

Lifespan characteristics were measured in the same manner as in Evaluation Example 2, and evaluation results were shown in the following Table 3.

TABLE 3

| | Upper layer | | | Lower layer | | Energy density (Wh/L) | Rapid charging time (min) | Capacity retention rate (%) |
|---|---|---|---|---|---|---|---|---|
| | Active material | D2-1/ D2-2 | Particle size (D2) (μm) | Active material | Particle size (D1) (μm) | | | |
| Example 1 | Artificial graphite | 0.72 | 10.7 | Artificial graphite | 18 | 590 | 18.8 | 98.2 |
| Example 5 | Artificial graphite | 0.72 | 10.7 | Natural graphite | 18 | 591 | 20.7 | 97.8 |
| Example 6 | Natural graphite | 0.72 | 10.7 | Artificial graphite | 18 | 591 | 23.1 | 83.2 |
| Example 7 | Natural graphite | 0.72 | 10.7 | Natural graphite | 18 | 593 | 24.8 | 82.3 |

As can be seen in Table 3, all of Examples 5 to 7 showed lower performance than Example 1 in which artificial graphite is used as both of the active materials of the upper layer and the lower layer.

Specifically, in a case of Examples 5 and 6 in which natural graphite is included in the upper layer or the lower layer, it is decided that a performance degradation problem has seriously occurred because of permeation or a decomposition reaction of the electrolyte caused by the exposure of edge surfaces of natural graphite particles due to an irregular structure of the natural graphite particles, the performance degradation problem occurred seriously, such that capacity retention rates were decreased. In particular, in a case of Example 6 in which the natural graphite is used in the upper layer, it is decided that the above-described problem has more seriously occurred, such that lifespan characteristics were decreased.

Therefore, in an electrode design according to the present invention, it can be seen that it is more preferable to use the artificial graphite as the electrode active material.

Evaluation Example 4: Evaluation of Lifespan Characteristics According to Contents of Silicon Oxide-Based Active Materials in First and Second Negative Electrode Active Material Layers Examples 8 to 11

Negative electrodes were manufactured in the same manner in Example 1 except that in Steps 1 and 2 of Example 1, types and contents of each electrode active material were types and contents shown in the following Table 4. In this case, in Steps 1 and 2, a total content of negative active materials (artificial graphite and SiO) in each slurry was maintained at 93.4 wt %.
(Evaluation Method)
Evaluation of Cycle Lifespan Characteristics Lifespan characteristics were measured in the same manner as in Evaluation Example 2, and evaluation results were shown in the following Table 4.

TABLE 4

|  | Upper layer (second negative electrode active material layer) | | | Lower layer (first negative electrode active material layer) | | | | |
|---|---|---|---|---|---|---|---|---|
|  | Artificial graphite | | | Particle size | | | Rapid | |
|  | D2-1/ D2-2 | Particle size (D2) (μm) | Content (wt %) of SiO | (D1) (μm) of artificial graphite | Content (wt %) of SiO | Energy density (Wh/L) | charging time (min) | Capacity rate (%) |
| Example 1 | 0.72 | 10.7 | — | 18 | — | 590 | 18.8 | 98.2 |
| Example 8 | 0.72 | 10.7 | 12 | 18 | 0 | 650 | 16.6 | 98.0 |
| Example 9 | 0.72 | 10.7 | 9 | 18 | 3 | 650 | 16.6 | 98.4 |
| Example 10 | 0.72 | 10.7 | 6 | 18 | 6 | 650 | 16.6 | 96.1 |
| Example 11 | 0.72 | 10.7 | 3 | 18 | 9 | 650 | 16.6 | 81.8 |

As can be seen in Table 4, in a case of Examples 8 to 11 in which both of silicon oxide and artificial graphite were used as the negative active material, rapid charging times were significantly shorter and energy densities were higher than those in Example 1 in which only the artificial graphite was used as the negative active material. In particular, in a case of Examples 8 and 9 in which a content of SiO in the upper layer was more than two times the content of SiO in the lower layer, capacity retention rates were higher than those in Examples 10 and 11.

Specifically, it is decided that both of SiO and the artificial graphite were used as the negative active material, such that high initial energy densities were exhibited, and more SiO than two times the content of SiO in the lower layer was included in the upper layer, and thus, rapid charging and discharging by a high C-rate current was possible even in a low SOC region, such that rapid charging times were shortened and capacity retention rates were also high.

The negative electrode for a secondary battery according to the present invention has an advantage that rapid charging characteristics are excellent even under a condition of a high rolling density (negative electrode) and loading amount (negative electrode active material).

In addition, the negative electrode for a secondary battery having an improved adhesion between the current collector and the negative electrode active material layer even under a rapid charging condition may be provided, such that a problem such as a decrease in capacity that may be caused by a charging and discharging process for a long time may be prevented.

What is claimed is:

1. A negative electrode for a secondary battery, comprising:
a current collector;
a first negative electrode active material layer formed on the current collector and containing a first active material; and
a second negative electrode active material layer formed on the first negative electrode active material layer and containing a second active material,
wherein the second active material is a bimodal active material including small particles and large particles having different particle sizes,
a particle size (D2) of the second active material is an average particle size of the small particles and the large particles, and
the particle size (D2) of the second active material is 6 to 15 μm,
wherein the first and second negative electrode active material layers further includes a silicon oxide-based active material ($SiO_x$ (0<x<2)),
wherein the silicon oxide-based active materials in the first and second negative electrode active material layers satisfy the following Relational Equation 1:

$$W2 > 2*W1 \quad \text{[Relational Equation 1]}$$

wherein W1 is a content of the silicon oxide-based active material in the first negative electrode active material layer, W2 is a content of the silicon oxide-based active material in the second negative electrode active material layer.

2. The negative electrode for a secondary battery of claim 1, wherein the small particles have a particle size (D50) of 30 to 90% of a particle size (D50) of the large particles.

3. The negative electrode for a secondary battery of claim 2, wherein the small particles have a particle size (D50) of 30 to 80% of the particle size (D50) of the large particles.

4. The negative electrode for a secondary battery of claim 1, wherein the particle size (D2) of the second active material is smaller than a particle size (D1) of the first active material.

5. The negative electrode for a secondary battery of claim 4, wherein the particle size (D2) of the second active material is 20% to 95% of the particle size (D1) of the first active material.

6. The negative electrode for a secondary battery of claim 5, wherein the particle size (D2) of the second active material is 30% to 70% of the particle size (D1) of the first active material.

7. The negative electrode for a secondary battery of claim 1, wherein the first and second active materials include one or more selected from the group consisting of natural graphite, artificial graphite, graphitized carbon fiber, graphitized mesocarbon microbeads, and amorphous carbon.

8. The negative electrode for a secondary battery of claim 7, wherein the first and second active materials are artificial graphite.

9. The negative electrode for a secondary battery of claim 1, wherein the first and second negative electrode active material layers further include a binder, and the binder is a water-soluble binder.

10. The negative electrode for a secondary battery of claim 9, wherein the binder includes styrene-butadiene rubber.

11. The negative electrode for a secondary battery of claim 1, wherein the negative electrode has a rolling density of 1.65 to 1.85 g/cc.

12. A secondary battery comprising:
the negative electrode of claim 1;
a positive electrode;
a separator interposed between the negative electrode and the positive electrode; and
an electrolyte.

* * * * *